US008327801B1

(12) United States Patent
Tierney

(10) Patent No.: US 8,327,801 B1
(45) Date of Patent: Dec. 11, 2012

(54) PET LITTER BOX

(76) Inventor: Patricia Ann Tierney, Cape Coral, FL (US)

(*) Notice: Subject to any disclaimer, the term of this patent is extended or adjusted under 35 U.S.C. 154(b) by 147 days.

(21) Appl. No.: 12/882,866

(22) Filed: Sep. 15, 2010

Related U.S. Application Data

(60) Provisional application No. 61/242,794, filed on Sep. 15, 2009.

(51) Int. Cl.
*A01K 1/01* (2006.01)
(52) U.S. Cl. ......................................................... 119/165
(58) Field of Classification Search .................. 119/165, 119/166
See application file for complete search history.

(56) References Cited

U.S. PATENT DOCUMENTS

| | | | | | |
|---|---|---|---|---|---|
| 3,796,188 | A | * | 3/1974 | Bradstreet | 119/166 |
| 4,469,046 | A | * | 9/1984 | Yananton | 119/169 |
| 4,517,920 | A | * | 5/1985 | Yamamoto | 119/166 |
| 4,926,794 | A | * | 5/1990 | Yamamoto | 119/165 |
| 4,970,987 | A | * | 11/1990 | Deyle | 119/166 |
| 5,193,488 | A | * | 3/1993 | Walton | 119/166 |
| 5,211,133 | A | * | 5/1993 | Foley | 119/166 |
| 5,220,886 | A | * | 6/1993 | Hyde | 119/165 |
| 5,515,812 | A | * | 5/1996 | Faust | 119/166 |
| 5,749,317 | A | * | 5/1998 | Richey et al. | 119/166 |
| 6,059,247 | A | * | 5/2000 | Olivadoti | 248/346.04 |
| 6,332,429 | B1 | * | 12/2001 | Gramlich | 119/165 |
| 6,487,989 | B2 | * | 12/2002 | Yamamoto | 119/161 |
| 6,523,495 | B1 | * | 2/2003 | Rydman | 119/167 |
| 6,742,476 | B2 | * | 6/2004 | Sage, Jr. | 119/166 |
| 6,994,054 | B2 | * | 2/2006 | Matsuo et al. | 119/166 |
| 7,107,933 | B2 | * | 9/2006 | Mohr | 119/166 |
| 7,128,023 | B2 | * | 10/2006 | Otsuji et al. | 119/169 |
| 7,131,396 | B2 | * | 11/2006 | Matsuo et al. | 119/166 |
| 7,380,519 | B2 | * | 6/2008 | Ikegami et al. | 119/167 |

* cited by examiner

Primary Examiner — Yvonne Abbott
(74) Attorney, Agent, or Firm — Michael D. Eisenberg

(57) ABSTRACT

A pet litter box, comprising: a housing having left, right, front and back side walls defining a well, the housing including at least one ridge disposed on a side wall and at least one depression disposed on at least one side wall; a grid having plurality of holes between grid lines and configured to slide into the depression of the side wall of the housing; and a locking frame having an open interior, configured to slide and lock into the well of the housing, below the ridge and over the grid.

17 Claims, 16 Drawing Sheets

15, 35, 40

115

15, 35, 40

PET LITTER BOX

CROSS-REFERENCES TO RELATED APPLICATIONS

The present application claims priority from U.S. Provisional Application Ser. No. 61/242,794 filed on Sep. 15, 2009, which is hereby incorporated herein by reference in its entirety.

TECHNICAL FIELD

The present invention, in some embodiments thereof, relates to an apparatus for managing pet waste.

BACKGROUND OF THE INVENTION

The present invention relates to pet litter boxes and has particular application as a dog litter box.

BRIEF SUMMARY OF EMBODIMENTS OF THE INVENTION

The present invention relates to a pet litter box, comprising: a housing having left, right, front and back side walls defining a well, the housing including at least one ridge disposed on a side wall and at least one depression disposed on at least one side wall; a grid having plurality of holes between grid lines and configured to slide into the depression of the side wall of the housing; and a locking frame having an open interior, configured to slide and lock into the well of the housing, below the ridge and over the grid.

In a variant of the pet litter box, the depression is disposed below the ridge and the depression and the ridge are disposed in the same side wall.

In another variant of the pet litter box, two ridges are spaced apart at an equal height above a bottom of the well and two depressions spaced apart an equal eight above the bottom of the well and below the ridges.

In a further variant of the pet litter box, two tabs are spaced apart and disposed on an edge of the grid, the tabs spaced apart a distance equal to the spacing of the depressions.

In still another variant of the pet litter box, the grid includes a mechanism along an edge of the grid configured to engage with a mechanism on the locking frame.

In yet a further variant of the pet litter box, the locking mechanism comprises a male connector and a slot configured to receive the male connector.

In another variant of the pet litter box, an absorbent layer is disposed above the grid and held in place between the grid and the locking frame. The absorbent layer is configured in size and shape to completely cover the grid and be held down between the grid and locking frame along all edges of the layer.

In a further variant of the pet litter box: a locking mechanism is on an outside wall of the housing; a locking mechanism is on the grid and configured to engage the locking mechanism on the housing; a second locking mechanism on the locking frame is configured to engage the grid and secure a front of the locking frame to a front of the grid.

In still another variant of the pet litter box, an artificial grass layer is disposed above the absorbent pad.

In yet a further variant of the pet litter box: the housing has left, right, front and back side walls defining a well; a grid has a plurality of holes between grid lines and configured to slide and lock into the well of the housing; a locking frame has an open interior, configured to slide and lock into the well of the housing, and lock onto the grid; an absorbent layer is disposed between the grid and the locking frame; an artificial grass layer is disposed above the absorbent layer.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

Figure 1:
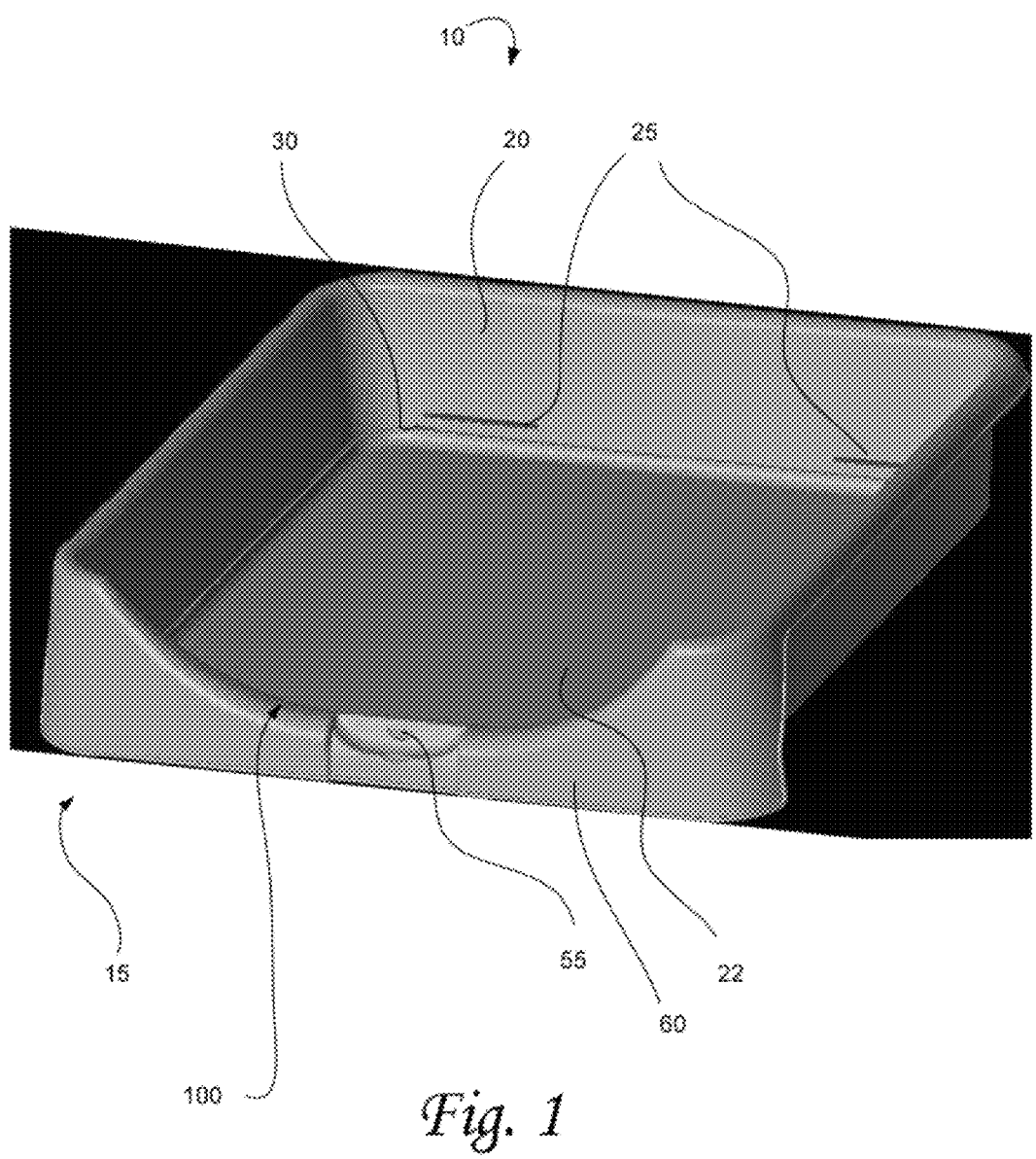
FIG. 1 is a perspective view of a housing of the pet litter box.
Figure 2:
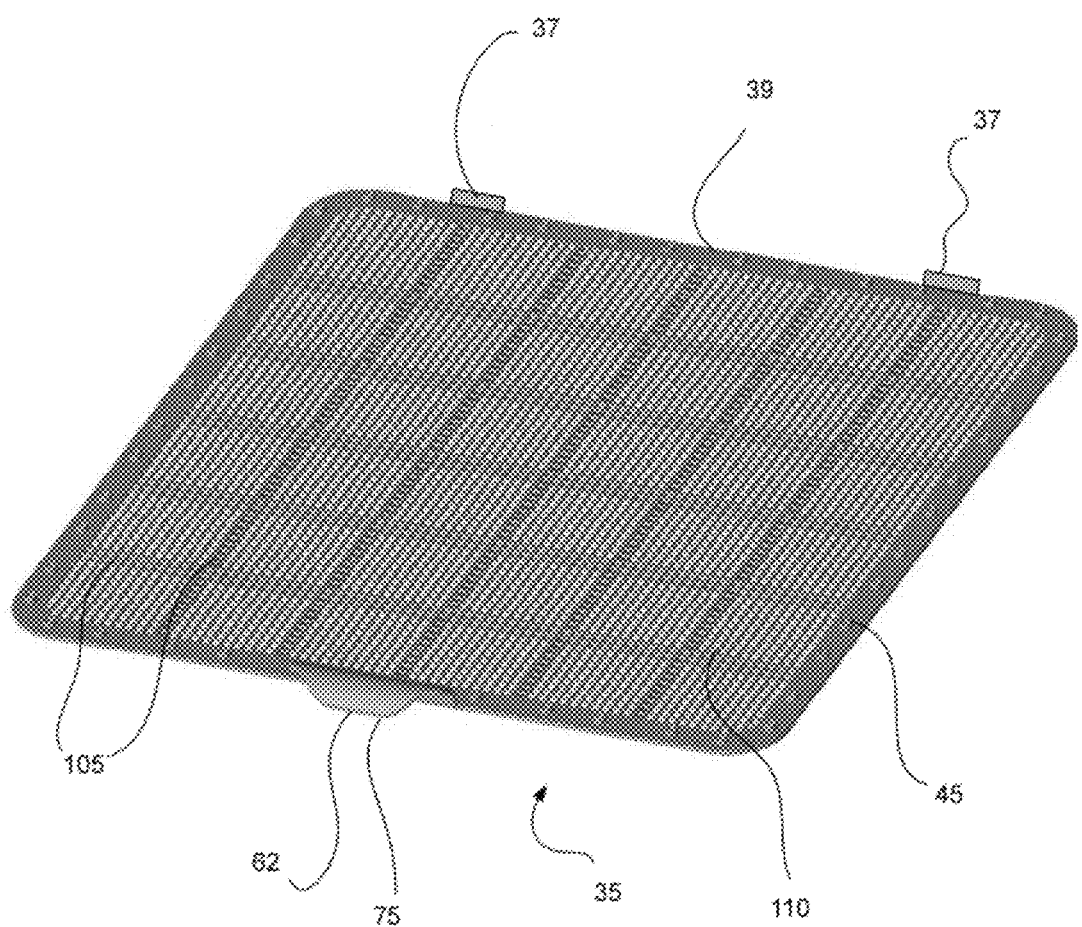
FIG. 2 is a perspective view of a grid.
Figure 3:
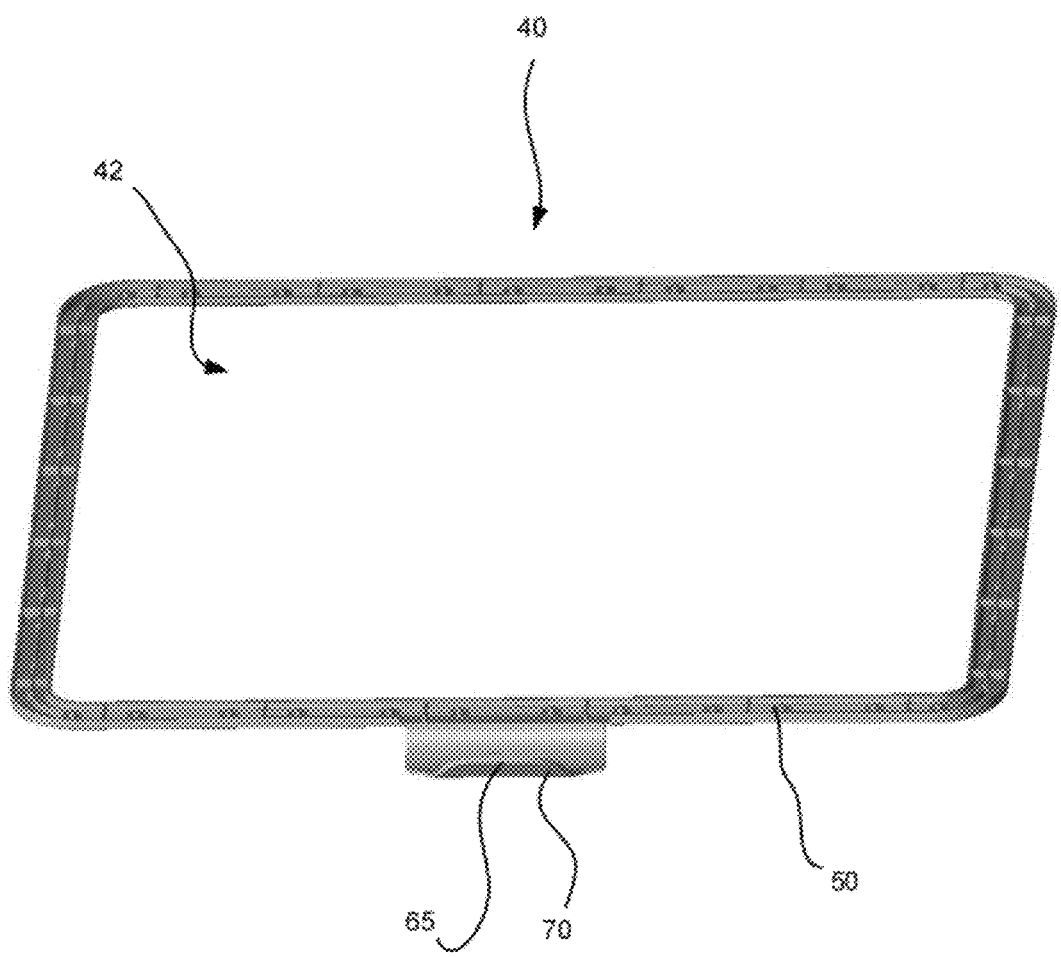
FIG. 3 is a perspective view of a locking frame.
Figure 4:
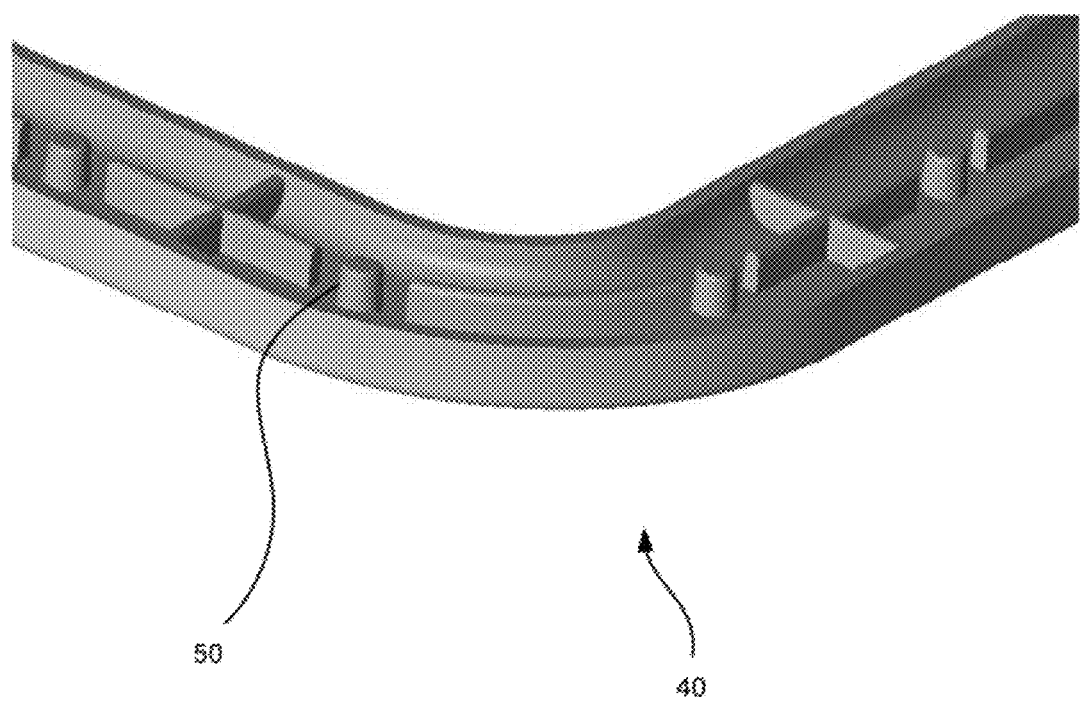
FIG. 4 is a detail view of the locking frame.
Figure 5:
FIG. 5 is a perspective view of housing, grid and locking frame assembly.
Figure 6:
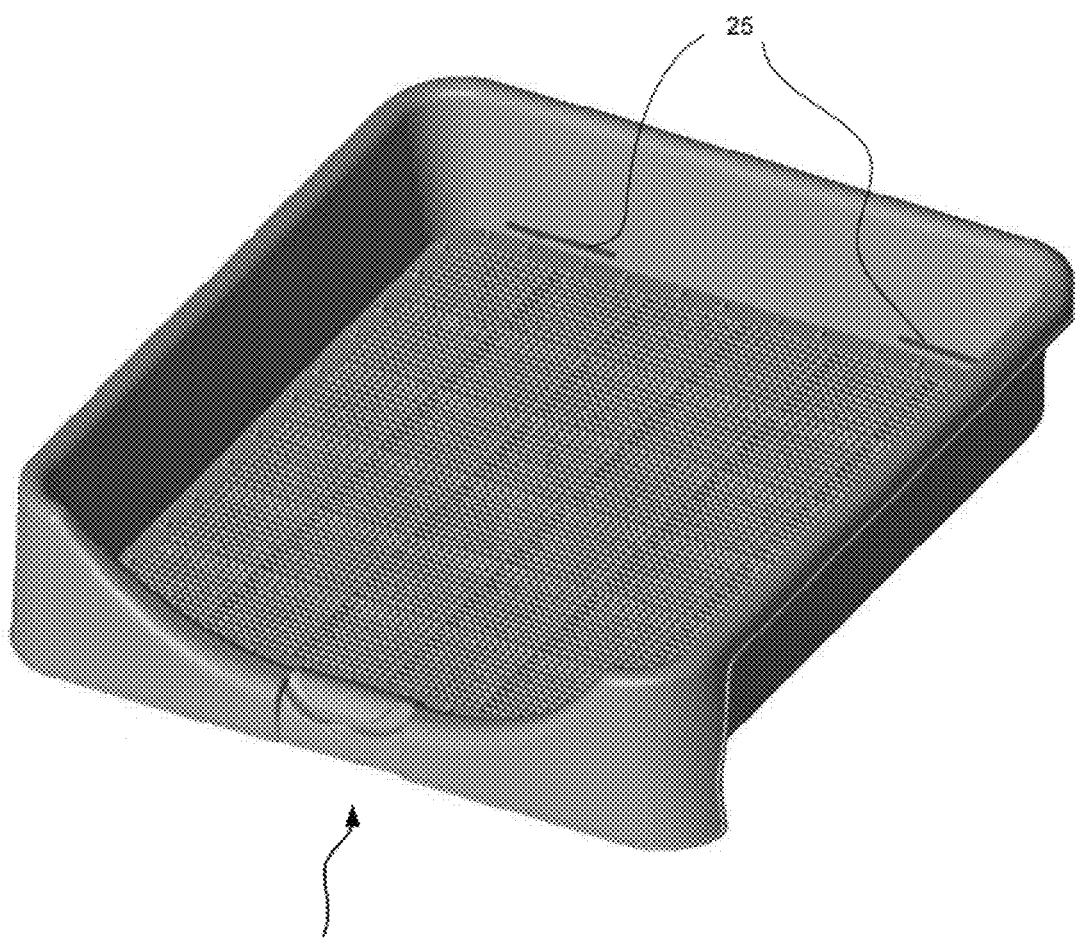
FIG. 6 is a perspective view of a housing and grid assembly.
Figure 7:
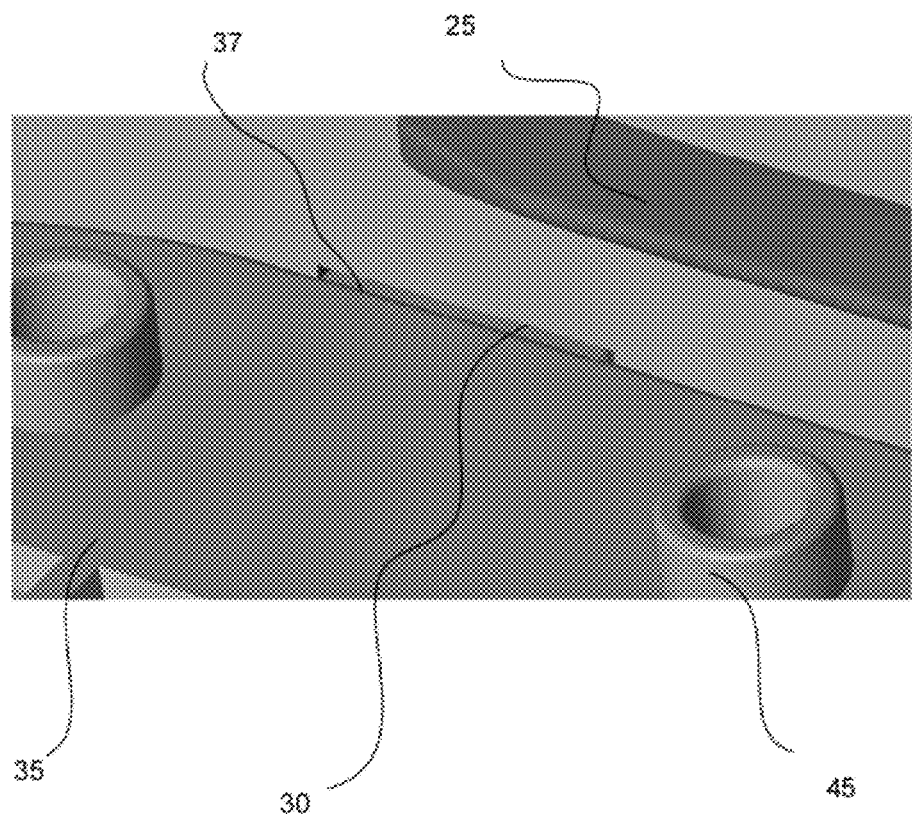
FIG. 7 is a detail view of the grid and housing assembly.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The present invention, in some embodiments thereof, relates to a pet litter box. Referring to the figures, the pet litter box 10 comprises a housing 15 having left, right, front and back 20 side walls defining a well 22. The housing includes a pair of ridges 25 disposed on the back wall 20 and a pair of depressions 30 below the ridges 25 in the back wall 20. A grid 35 having plurality of holes between grid lines and has extension tabs 37 on a back edge 39 of the grid configured to slide into the depressions 30 in the side wall of the housing 15. The tabs 37 are spaced apart a distance equal to the spacing of the depressions 30. A locking frame 40 has an open interior 42, configured to slide and lock into the well of the housing 15, below the 25s 25 and over the grid 35.

In a variant, the ridges 25 are spaced apart at an equal height above a bottom of the well and the two depressions 30 are spaced apart an equal eight above the bottom of the well and below the ridges 25.

In another variant, the grid 35 includes a mechanism 45 along the edge of the grid 35 configured to engage with a mechanism 50 on the locking frame. In one aspect, the locking mechanism comprises a plurality of female cylindrical slots 45 on the grid 35 and a plurality of male cylindrical connectors 50 on the locking frame 40 configured to receive into the female slots 45.

In a further variant, the pet litter box 10 includes an absorbent pad 52 or layer above the grid 35 and is held in place between the grid 35 and the locking frame 40. The absorbent layer is configured in size and shape to completely cover the grid 35 and be held down between the grid 35 and locking frame 40 along all edges of the pad.

Figure 12:
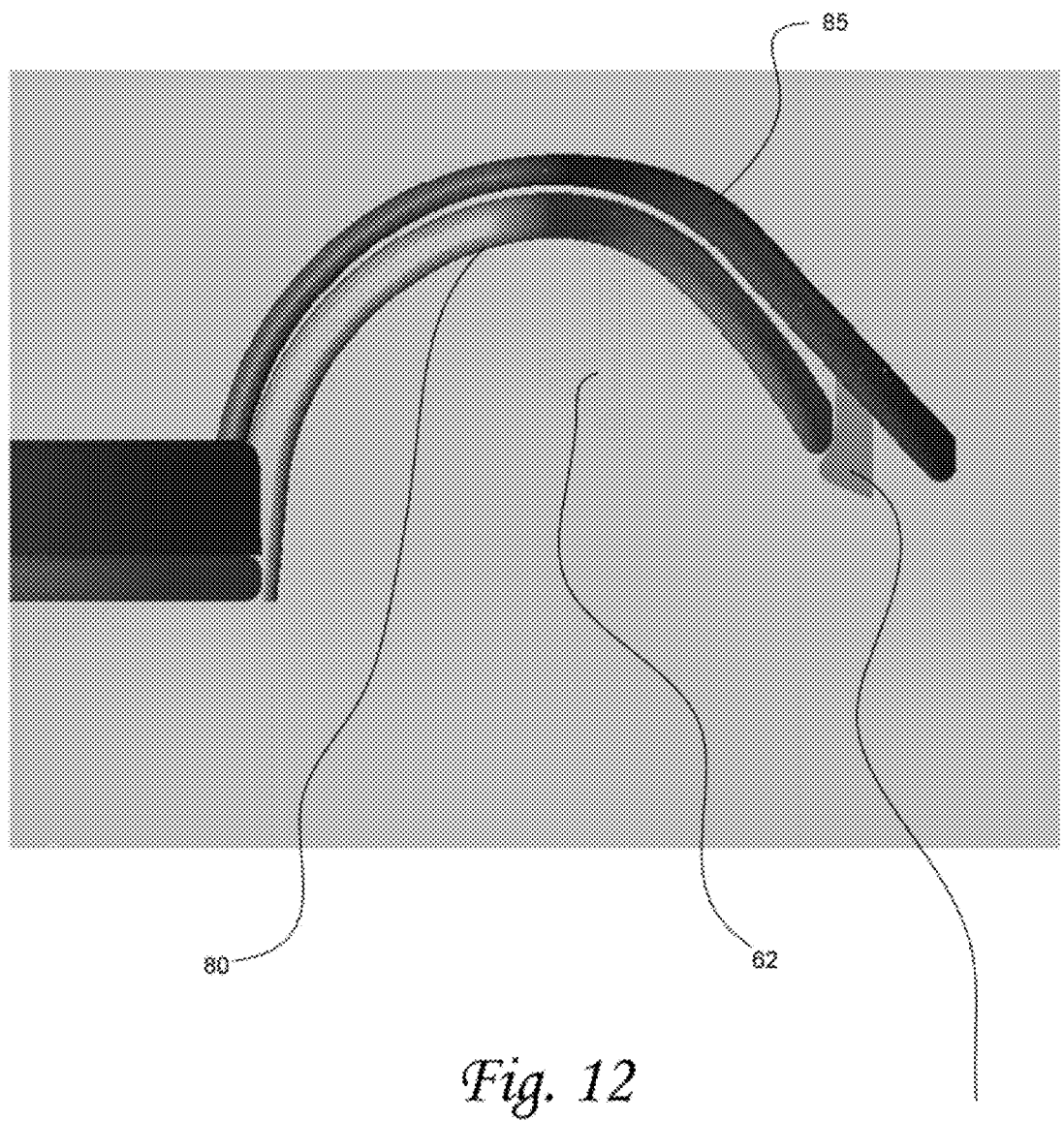
FIG. 12 is a detail view of the locking mechanisms of the grid and locking frame.
Figure 13:
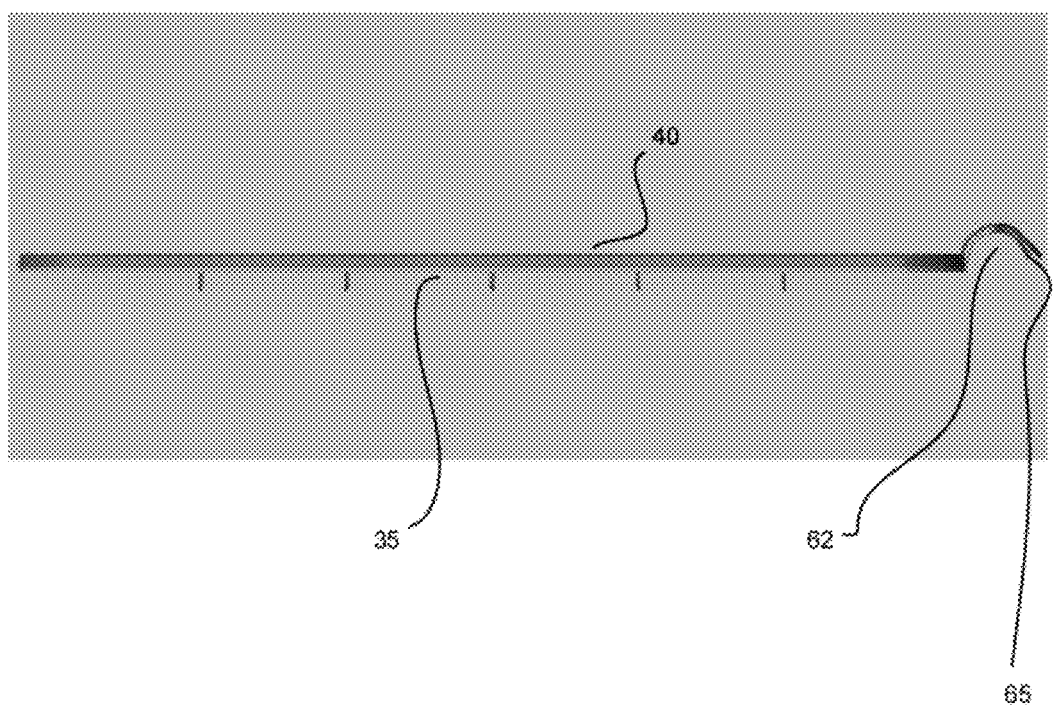
FIG. 13 is a side view of the grid and locking frame assembly.
Figure 14:
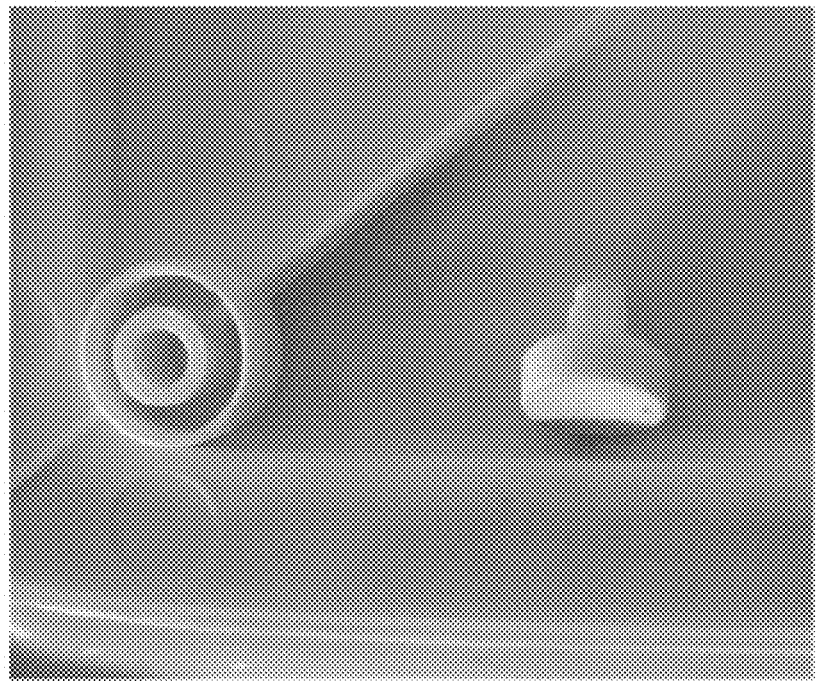
FIG. 14 is a detail view of the anti-skid pad on the bottom of the housing.
Figure 14:
Figure 15:
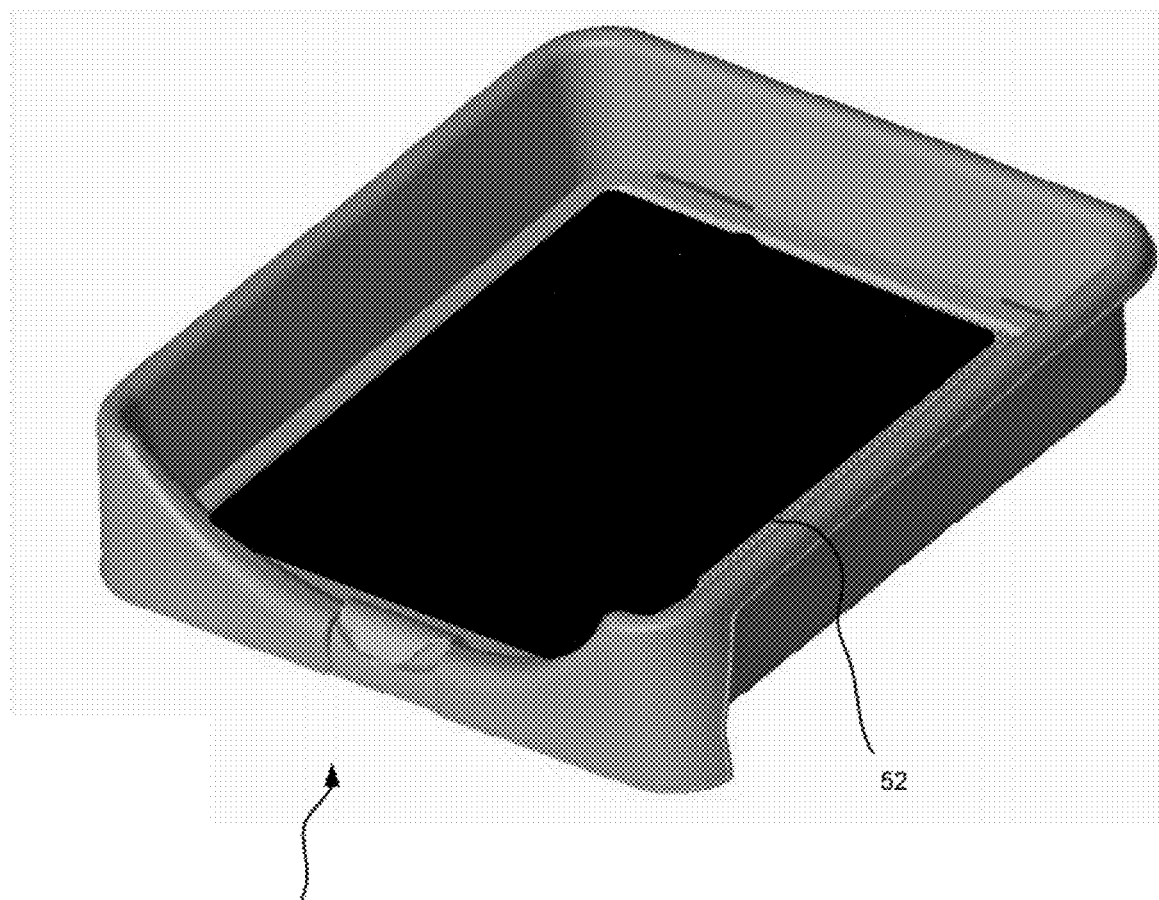
FIG. 15 is a perspective view of the housing, grid, locking frame and absorbent pad assembly.
Figure 16:
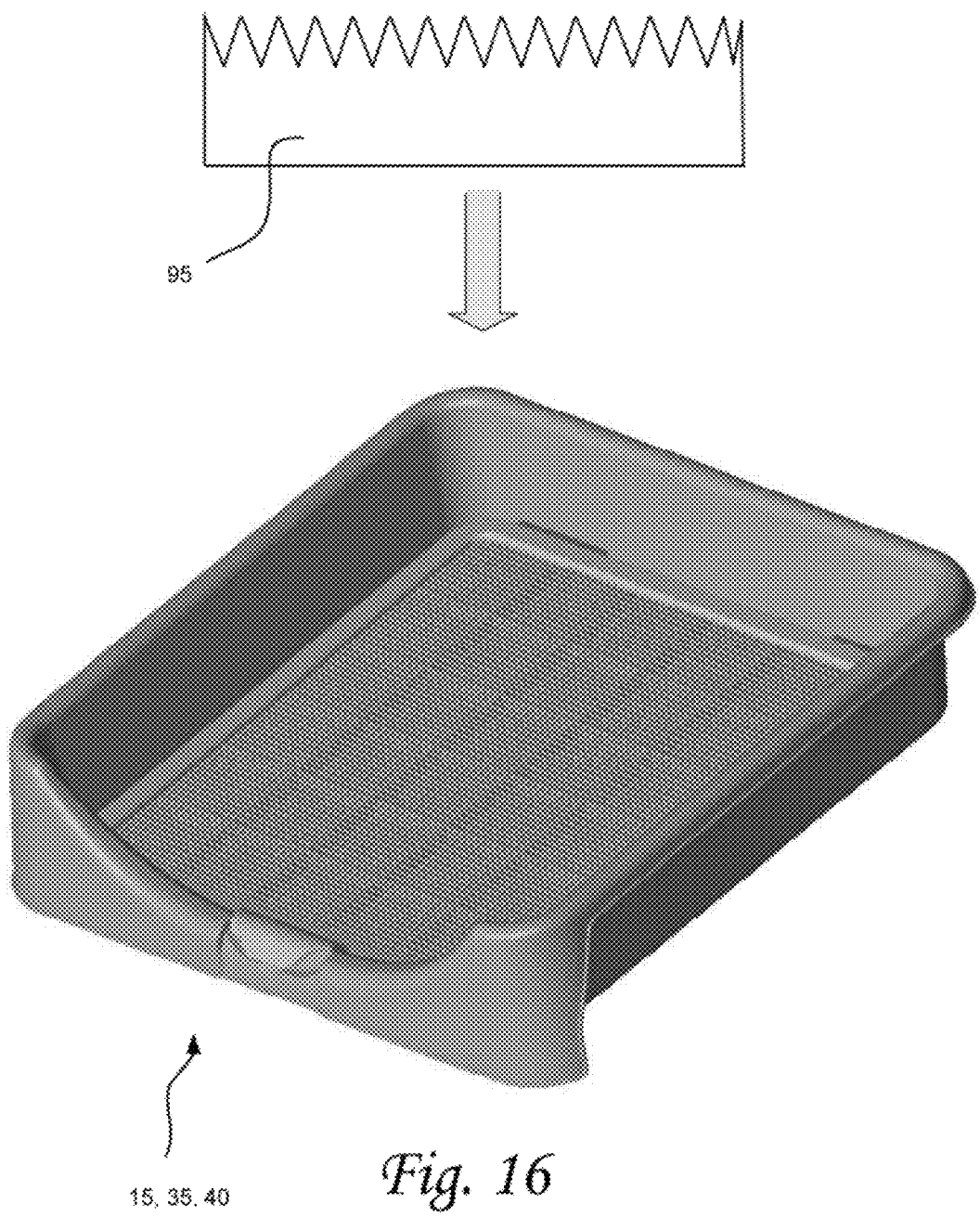
FIG. 16 is a perspective view of the pet litter box with artificial grass.

Referring to FIGS. 1 and 12, the pet litter box has a locking mechanism 55 on an outside wall 60 of the housing. A locking mechanism 62 on an edge of the grid is configured to engage the locking mechanism 55 on the housing. A second locking mechanism 65 on the locking frame 40 is configured to engage the grid 35 and secure a front 70 of the locking frame to a front 75 of the grid 35. In one aspect, the locking mechanism 55 on the housing is a tab 55 that allows a hook 62 on the grid to catch the tab 55 and secure the grid to the housing. In another aspect, the grid includes curved extension piece 80 configured to mate with a curved extension piece 85 on the locking frame 40 and a hook 65 on the locking frame 40 is configured to catch an end of the curved extension piece 80 of the grid 35 to help secure the locking frame 40 to the grid 35.

In still another variant, the pet litter box includes an artificial grass layer 95. The artificial grass 95 may be disposed above the absorbent pad 52 or disposed on the grid with no pad 52 present.

Figure 8:
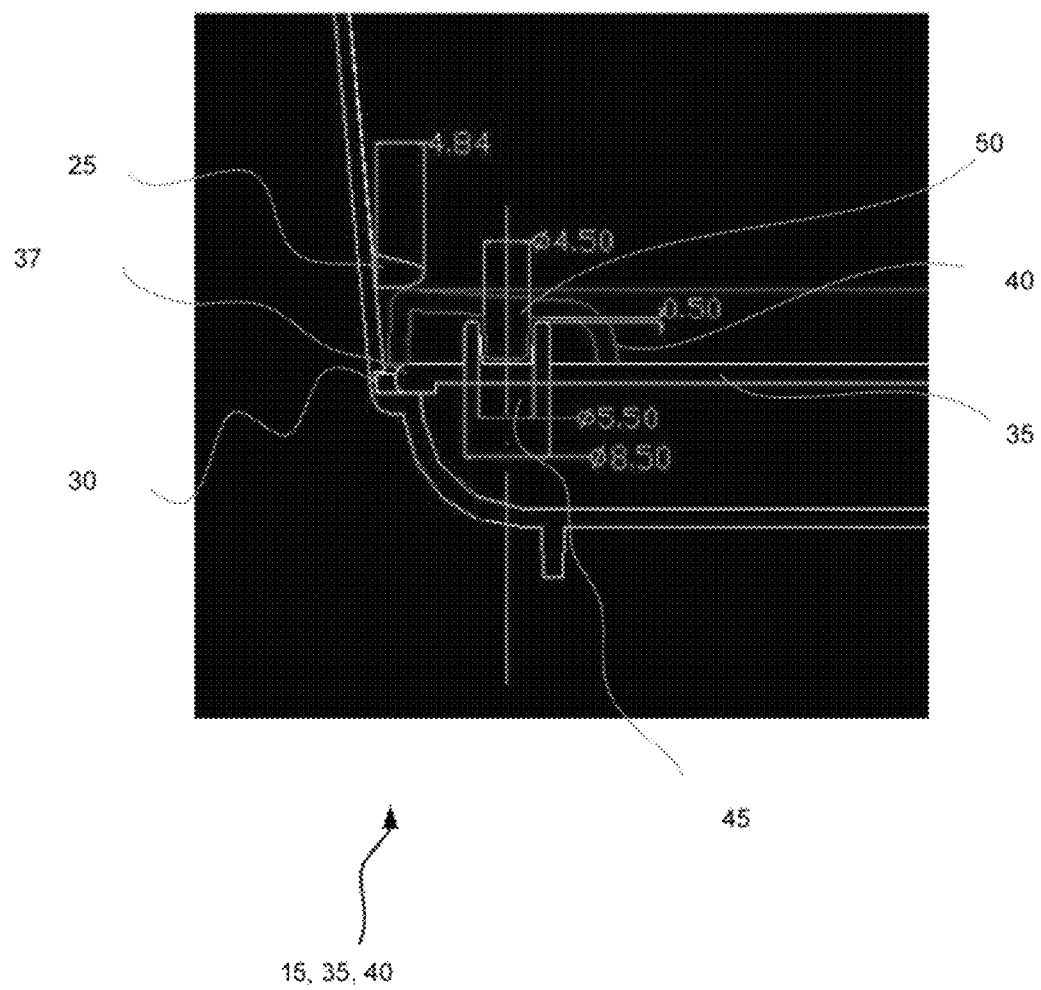
FIG. 8 is a diagram illustrating the housing, grid and locking frame assembly.
Figure 9:
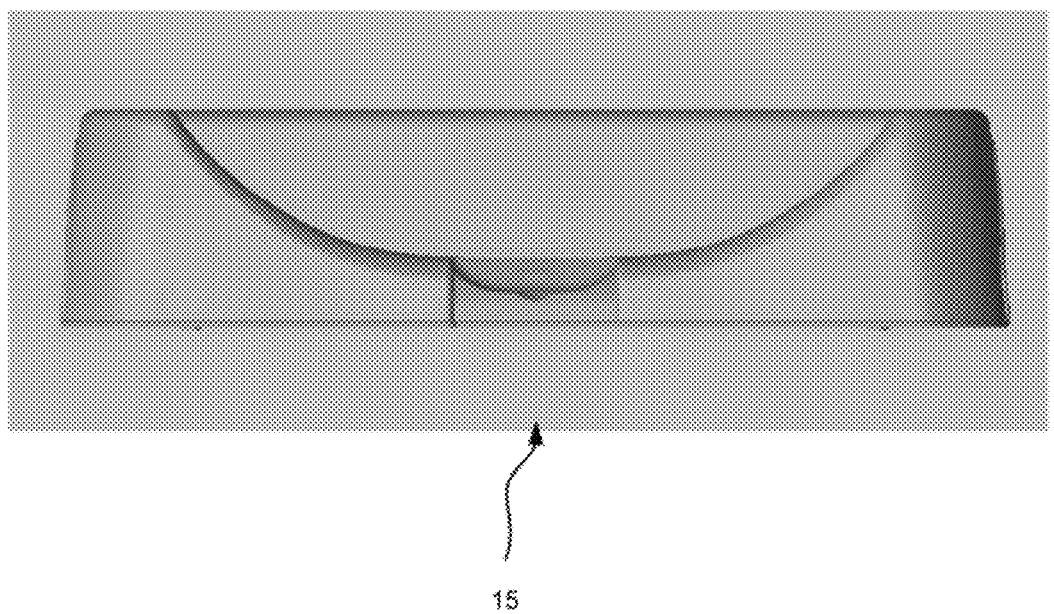
FIG. 9 is a front view of the housing.
Figure 10:
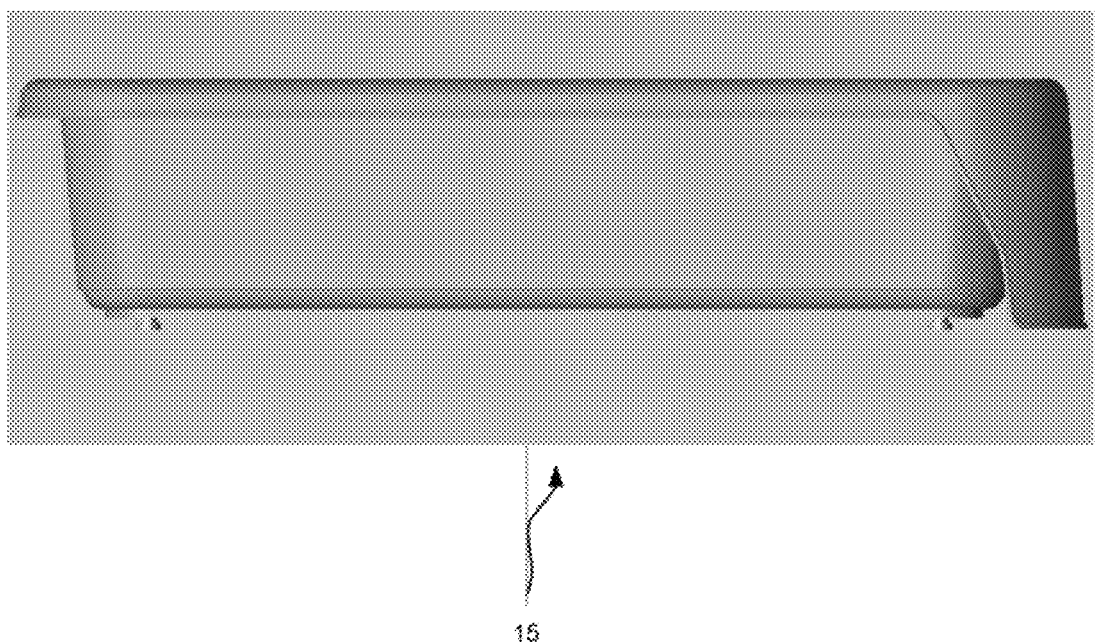
FIG. 10 is a side view of the housing.
Figure 11:
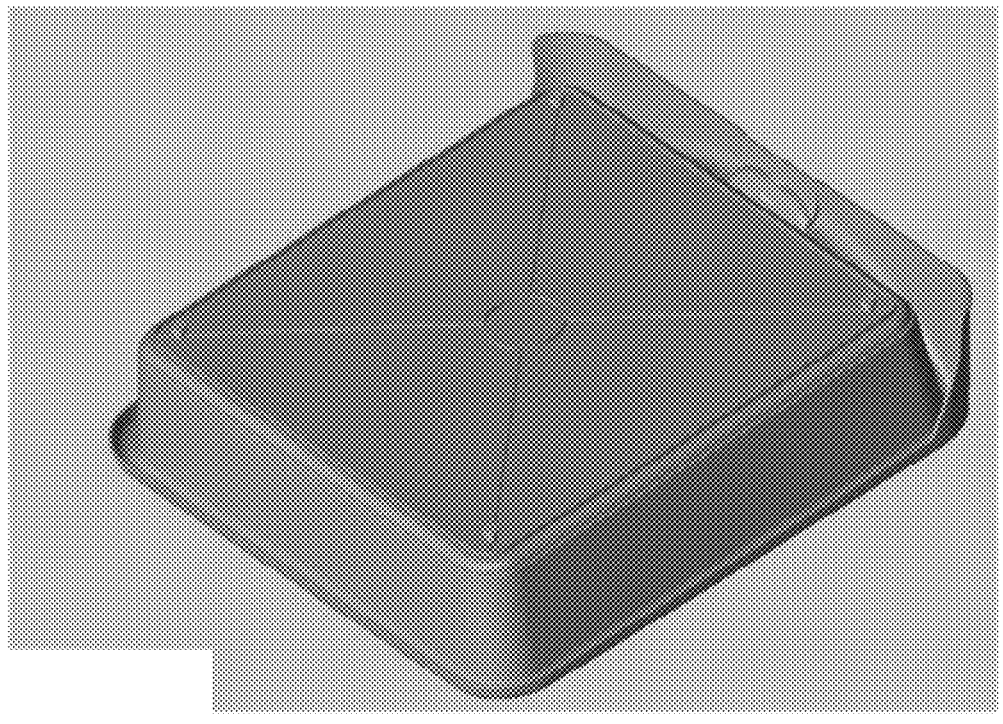
FIG. 11 is a bottom view of the housing.
Figure 11:

In a variant, referring to the figures, the housing may include anti-skid pads 115 on the bottom of the housing. The housing has three side walls and a fourth front wall having a curved cutout 100 to permit easy ingress and egress to the litter box. The grid 35 includes major 105 and minor 110 gridlines that define a plurality of grid holes and cylindrical connectors disposed along the edges of the grid 35. The locking mechanism 40 is configured generally as a closed perimeter configured to overlap the edges of the grid and interlock onto the grid, pinching any pad 52 that has been placed over the grid. FIG. 8 is a diagram illustrating the placement of the grid and locking frame within the housing.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A pet litter box, comprising:
   a housing having left, right, front and back side walls defining a well, the housing including at least one ridge disposed on a side wall and at least one depression disposed on at least one side wall;
   a grid comprising a plurality of holes between grid lines and configured to slide into the depression of the side wall of the housing, and a locking mechanism along an edge of said grid;
   a locking frame having an open interior, configured to slide and lock into the well of the housing, below the ridge and over the grid; and
   a locking mechanism on an outside wall of said housing to engage said locking mechanism on said grid.

2. The pet litter box of claim 1, wherein the depression is disposed below the ridge and the depression and the ridge are disposed in the same side wall.

3. The pet litter box of claim 2, further comprising two ridges spaced apart at an equal height above a bottom of the well and two depressions spaced apart an equal eight above the bottom of the well and below the ridges.

4. The pet litter box of claim 3, further comprising two tabs spaced apart and disposed on an edge of the grid, the tabs spaced apart a distance equal to the spacing of the depressions.

5. The pet litter box of claim 4, wherein the grid includes a mechanism along an edge of the grid configured to engage with a mechanism on the locking frame.

6. The pet litter box of claim 5, wherein the locking mechanism comprises a male connector and a slot configured to receive the male connector.

7. The pet litter box of claim 5, further comprising an absorbent layer above the grid and held in place between the grid and the locking frame, the absorbent layer configured in size and shape to completely cover the grid and be held down between the grid and locking frame along all edges of the layer.

8. The pet litter box of claim 7, further comprising:
   a second locking mechanism on the locking frame configured to engage the grid and secure a front of the locking frame to a front of the grid.

9. The pet litter box of claim 7, further comprising an artificial grass layer disposed above the absorbent pad.

10. A pet litter box, comprising:
    a housing having left, right, front and back side walls defining a well;
    a grid having plurality of holes between grid lines and configured to slide and lock into the well of the housing;
    a locking frame having an open interior, configured to slide and lock into the well of the housing, and lock onto the grid;
    an absorbent layer, disposed between the grid and the locking frame;
    an artificial grass layer disposed above the absorbent layer.

11. A pet litter box, comprising:
    a housing having left, right, front and back side walls defining a well, the housing including at least one ridge disposed on a side wall and at least one depression disposed on at least one side wall;
    a grid comprising a plurality of holes between grid lines and configured to slide into the depression of the side wall of the housing, and a locking mechanism along an edge of said grid; and
    a locking frame comprising an open interior, configured to slide and lock into the well of the housing, below the ridge and over the grid and a locking mechanism on the housing configured to engage said locking mechanism on said grid.

12. The pet litter box of claim 11, wherein the depression is disposed below the ridge and the depression and the ridge are disposed in the same side wall.

13. The pet litter box of claim 12, further comprising two ridges spaced apart at an equal height above a bottom of the well and two depressions spaced apart an equal eight above the bottom of the well and below the ridges.

14. The pet litter box of claim 13, further comprising two tabs spaced apart and disposed on an edge of the grid, the tabs spaced apart a distance equal to the spacing of the depressions.

15. The pet litter box of claim 11, wherein the locking mechanism along an edge of the grid comprises a male connector and a slot configured to receive the male connector.

16. The pet litter box of claim 15, further comprising an absorbent layer above the grid and held in place between the grid and the locking frame, the absorbent layer configured in size and shape to completely cover the grid and be held down between the grid and locking frame along all edges of the layer.

17. The pet litter box of claim 16, further comprising an artificial grass layer disposed above the absorbent pad.

* * * * *